May 21, 1935.  G. R. JENESON  2,001,731

BLANK SHEARING APPARATUS

Filed June 30, 1933  2 Sheets-Sheet 1

INVENTOR
George R. Jeneson
BY
ATTORNEYS

May 21, 1935.  G. R. JENESON  2,001,731
BLANK SHEARING APPARATUS
Filed June 30, 1933  2 Sheets-Sheet 2
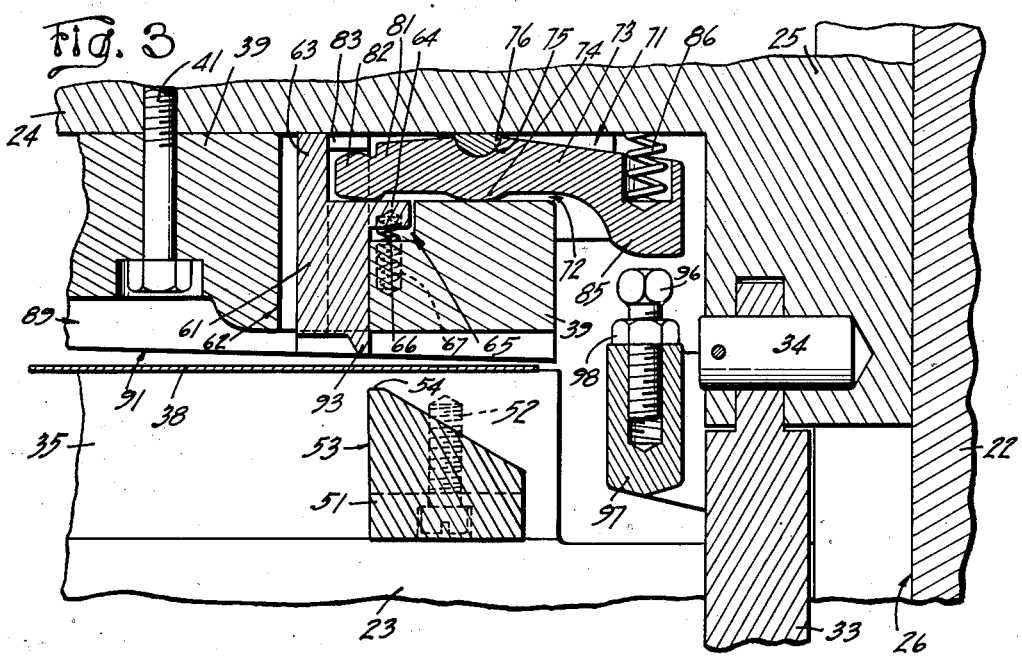
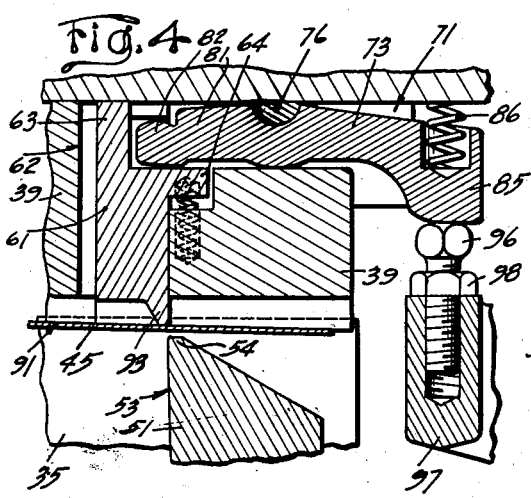
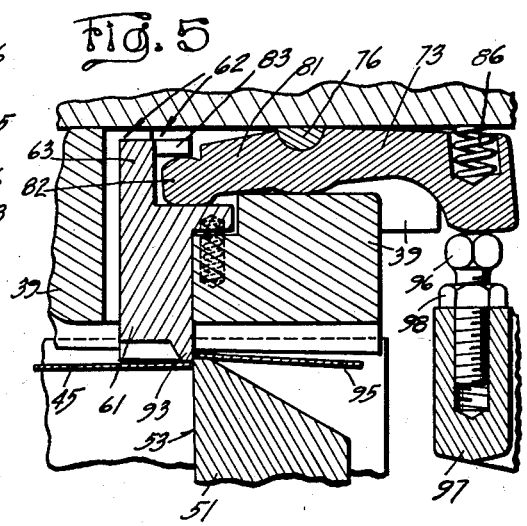
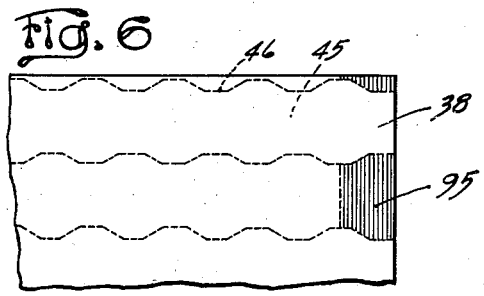
INVENTOR
George R. Jeneson
BY
ATTORNEYS Patented May 21, 1935

2,001,731

UNITED STATES PATENT OFFICE 2,001,731

BLANK SHEARING APPARATUS

George R. Jeneson, Cincinnati, Ohio, assignor to American Can Company, New York, N. Y., a corporation of New Jersey Application June 30, 1933, Serial No. 678,518

10 Claims. (Cl. 164—47)

The present invention relates in general to shearing machines and has more particular reference to improvements in such machines whereby recovery pieces are cut from metal blank strips while the strips are still in shearing position and held within the shearing die and directly following the shearing operation, the cutting being done without deformation by buckling or otherwise. This is possible for while both of the severing steps of strip shearing and recovery cutting are closely associated, they are distinct in their cutting action.

The invention contemplates providing blank strips for subsequent feeding through a press for cutting circular can ends or the like in a stagger cutting layout for the sheet which permits a more economic cutting with a minimum amount of wastage. In the cutting of strips according to the staggered layout spaces occur at the ends of some of the strips which are not sufficient in size to make a can end or other article for which the strips are used and this end space provides metal for a recovery piece which may be used for other and smaller shapes.

The principal object of the invention is the provision of an apparatus for severing and removing the recovery pieces from the ends of certain of the blank strips immediately following the shearing of the strip from the sheet and while the strips are still in the shearing dies.

The invention also contemplates a self-contained mechanism which operates auxiliary cutting dies for taking out the recovery pieces from the strip ends only after the strips have been fully sheared, both of the operations of shearing and cutting being obtained in the usual shearing press movement of the press slide which carries a part of the die mechanism.

Numerous other objects and advantages of the invention will be apparent as it is better understood from the following description, which, taken in connection with the accompanying drawings, discloses a preferred embodiment thereof.

Referring to the drawings:

Fig. 3 is a transverse sectional view taken substantially along the line 3—3 in Fig. 2;

Figs. 4 and 5 are fragmentary views illustrating parts of the mechanism disclosed in Fig. 3 and showing different steps in the strip shearing and recovery piece cutting operation; and Fig. 6 is a fragmentary view of one corner of a metal sheet in which is designated by dotted lines the cutting outlines for the blank strips and recovery pieces obtained from the sheet.

Figure 1:
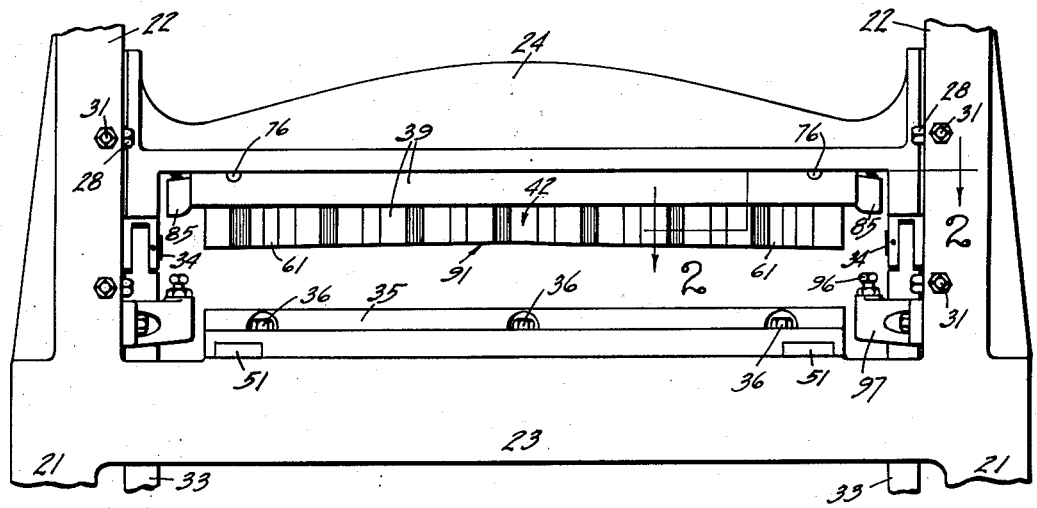
Figure 1 is a front elevation of a part of a shearing apparatus embodying the present invention.

The shearing apparatus comprises a frame 21 (Figs. 1 and 2) which is formed with side arms 22 of the usual arch frame construction, these arms being connected together by a bed 23. The bed 23 carries the fixed or stationary parts of the die mechanism and the movable parts are carried in a slide or cross head 24 formed at its ends with suitable side walls 25 which are mounted for vertical movement within grooves 26 formed in the arms 22.

Slide jibs 27 are located in the grooves 26 of the arms and provide adjustable side walls in the grooves for holding the cross head 24 in its movable position, bolts 28 securing the jibs to the shearing frame. Backing-up and adjusting screws 31 threadedly engage in the arms 22 and project against an edge of each jib 27 and provide a ready means for setting the jib slide face against the ends 25 of the cross head 24. Lock nuts 32 threadedly engaged on the screws 31 hold them in adjusted position. The cross head 24 is raised and lowered in the usual manner as by vertical movement of slide members 33 pivotally connected at 34 on each side of the cross head.

A pair of spaced lower fixed shearing dies 35 are supported on the bed 23 of the shearing frame and are held in stationary position by bolts 36. Where a stagger cut is desired to produce a blank strip, as herein shown, each shearing die 35 is formed with a scroll or undulating cutting edge 37 for shearing the longitudinal edges of the blank strips which are cut in the machine from a metallic sheet 38.

A movable shearing die 39 (Figs. 1, 2 and 3) is secured by bolts 41 to the crosshead 24 and is formed with side cutting walls 42 which are also scroll shaped or undulating to correspond and cooperate with the cutting edges 37 of the fixed dies 35. The blank strip so produced is indicated by the numeral 45 (Figs. 4 and 6) the strip being outlined by scroll bounding edges 46.

Figure 2:
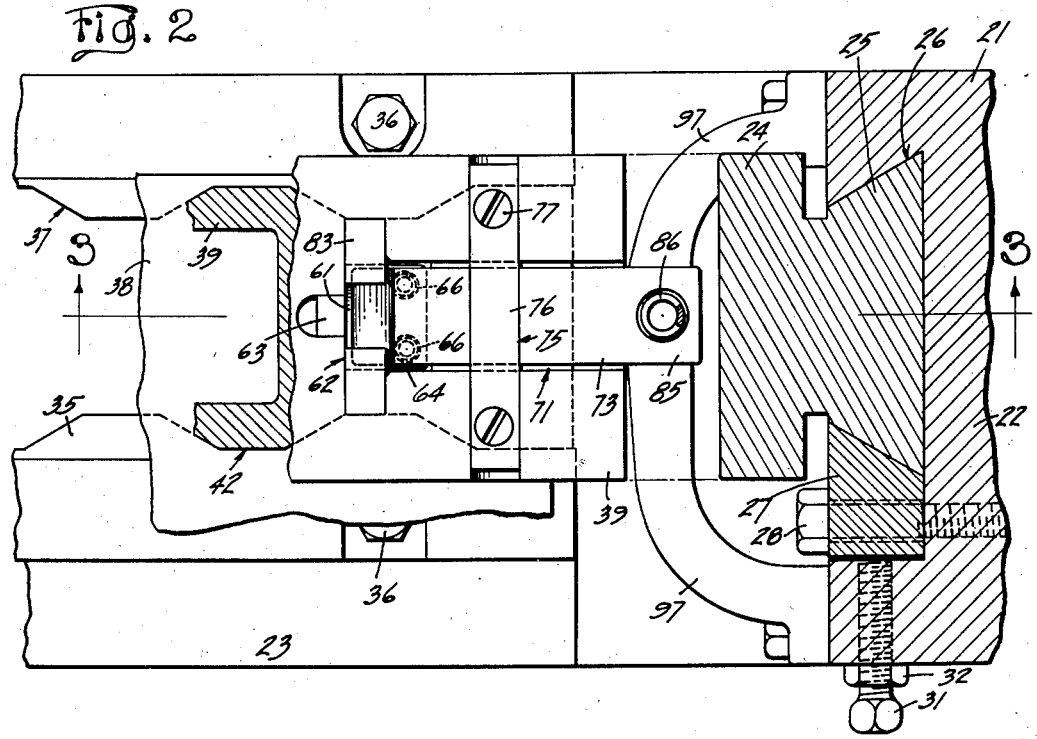
Fig. 2 is an enlarged plan sectional view of one end, taken substantially along the broken line 2—2 in Fig. 1.

A lower fixed auxiliary die 51 (Fig. 3) for cutting the strip end recovery pieces is secured by bolts 52 to the fixed shearing die 35, such an auxiliary die being located at each end and in between the dies 35. Each auxiliary die 51 is formed with a cutting wall 53 and its upper surface 54 is spaced below the upper surfaces of the dies 35. The sheet 38 is positioned for cutting on the dies 35 as shown in Figs. 2 and 3.

An upper or movable auxiliary die 61 (Figs. 3, 4 and 5) is formed as a slide block and is located within vertical grooves 62 cut in each end of the shearing die member 39. This die block 61 is formed with a vertically extending post 63 (see also Fig. 2) the upper surface of which engages the lower surface of the crosshead 24 when the die block is entirely confined within the shearing die in its non-cutting position.

Each die block 61 is also formed with a shelf 64 which extends into an opening 65 cut in the die member 39, this opening being adjacent the slot 62. Springs 66 are interposed between the lower surface of the shelf and the shearing die member. The lower end of each spring is seated within a vertical bore 67 formed in the die part 39. These springs hold the auxiliary die in its raised non-cutting position.

Each end of the shearing die 39 is also cut out adjacent the crosshead 24, at 71 to provide space for an actuating device for the die block 61, this space communicating with the upper end of the grooves 62. This cutting back of the end of the die 39 provides a horizontal wall 72 spaced from the bottom wall of the crosshead. An actuating lever 73 is disposed within the space 71 and rests upon the wall 72. The lower surface of the lever is formed near its center with a convex ridge 74 where it engages the wall 72 and directly above in its upper face the lever has a transverse trough or groove 75.

A semi-circular key 76 (Figs. 2 and 3) is imbedded in the upper surface of the movable shearing die 39 and is secured by screws 77 and this key rests within the groove 75 and provides a rocking support for the lever 73. The lever 73 is provided with an inner arm 81 which is rounded at its end 82. This end rests upon the die 61 and engages under a pair of spaced and hooked projections 83 formed in the die.

The opposite or outer end of the lever is formed with an enlarged head 85 and the lower end of a spring 86 is seated in a depression formed in the upper part of the head. The upper end of the spring rests against the crosshead 24. This spring presses against the headed end of the lever holding it in the non-actuating position illustrated in Fig. 3.

The central part of the lower surface of the shearing die 39 is cut back in a longitudinal slot 89 (Fig. 3) leaving spaced cutting or shear edges along each side. The bottom surfaces of the shear edges are formed into inclined cutting walls 91 (Fig. 1) the ends of the walls being lower than the center. This produces the shearing action of the die when it is brought down upon the sheet 38 resting on the lower dies 35. This movement is effected by a lowering of the crosshead 24.

The lower end of each of the auxiliary dies 61 is formed with a transverse cutting edge 93 (Fig. 3) which is entirely above the cutting surfaces 91 of the shearing die and therefore entirely enclosed during engagement of the shearing dies with the sheet. This position of the auxiliary dies is maintained throughout the shearing operation.

Immediately following the shearing operation (Fig. 4) this being after a severed strip 45 has been forced downwardly between the stationary shearing dies 35, the auxiliary die cutting edges 93 are moved downwardly beyond the lower shearing die surfaces 91 forcing the strip ends against the stationary auxiliary dies 51, the cutting edges 93 of the moving dies cooperating with the cutting edges 53 of the stationary dies 51, the moving dies passing through and severing a recovery piece 95 (Figs. 5 and 6) from each end of the strip resting between the shearing surfaces 37 of the dies 35. This action is effected by movement of the die blocks 61 within their grooves 62 in the movable shearing die 39.

Immediately following the shearing operation the parts are positioned as in Fig. 4. The head 85 of the lever 73 is just touching a stop bolt 96 threadedly secured in a yoke bracket 97 (see also Fig. 2) bolted to the side wall 22 at each side of the shearing frame. A lock nut 98 threadedly engaging the bolt 96 holds the bolt in its adjusted position.

Continued downward movement of the crosshead 24 from this position shifts the actuating devices for the die blocks into the position shown in Fig. 5. Since the head 85 of the lever 73 is prevented from further bodily movement by the stop bolt 96 the lever 73 is rocked on its key 76 as a fulcrum and its rounded end 82 is depressed, forcing down the die block 61.

Its cutting edge 93 moves downwardly ahead of the shearing die surfaces 91, thus cutting across the strip ends as the cutting edges 93 and 53 cooperate. Both of the springs 66 and 86 are thereupon compressed as the movable parts come into the position of Fig. 5.

The two die actions just described may be said to be self-contained and require only a continued downward movement of the crosshead to shear a strip and cut off its end recoveries. The outlined edges 46 of the strips 45 being fully severed before beginning of the cutting action of the die parts 61, 51, there is no buckling of the metal and both strips and recovery pieces are left in a flat condition. It will be observed by reference to Fig. 6 that the ends of alternate strips 45 are cut away to provide the recovery pieces 95, these being the strip ends containing the spaces inadequate for the production of can ends. The other strips have no such extra space as is well known in the art of stagger layouts for can ends, etc.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for cutting metal sheets to provide blank strips from which can ends and the like may be formed, the combination of opposed shearing dies for shearing longitudinal blank strips from said sheets, and opposed auxiliary dies associated with said shearing dies for cutting recovery pieces from said strips, one of said auxiliary dies being confined within a said shearing die until the latter has completed its shearing operation and being projectable into subsequent cutting operation by the movement of said shearing die.

2. In an apparatus for cutting metal sheets to provide blank strips from which can ends and the like may be formed, the combination of shearing dies having undulating cutting edges for shearing the sheets along longitudinal lines to produce blank strips having undulating edges, and auxiliary dies having straight cutting edges associated with said shearing dies and having a lower plane of cutting and operating subsequent to the shearing operation and while the said blank strip, within the cutting edges of said shearing dies is still in place, for cutting across the ends of said blank strip to remove recovery portions not useable for the can ends.

3. In an apparatus for cutting metal sheets to provide blank strips from which can ends and the like may be formed, the combination of shearing dies for shearing blank strips along their longitudinal edges, and auxiliary dies located in said shearing dies and adapted for movement relative to and associated with them and operating subsequent to the shearing operation for cutting across the ends of certain of said blank strips while they are still in said shearing dies to remove recovery portions not useable for the can ends.

4. In an apparatus for cutting metal sheets to provide blank strips from which can ends and the like may be formed, the combination of fixed and cooperating movable shearing dies for shearing blank strips along their longitudinal edges and fixed and cooperating movable auxiliary dies, the fixed auxiliary dies carried in said fixed shearing dies, the movable auxiliary dies carried in and adapted for movement relative to said movable shearing dies, and means associated with the movement of said movable shearing dies for operating said movable auxiliary dies moving them relative to the movable shearing dies to cut off parts of said blank strip and to remove recovery portions not useable for the can ends.

5. In an apparatus for cutting metal sheets to provide blank strips from which can ends and the like may be formed, the combination of a stationary frame, a crosshead mounted in said frame and having movement therein, fixed shearing dies carried in said frame, movable shearing dies carried in said crosshead and cooperating with said fixed shearing dies on movement of said crosshead for shearing blank strips along their longitudinal edges, fixed auxiliary dies carried in said fixed shearing dies and movable auxiliary dies associated with said movable shearing dies and movable relative to the shearing dies and cooperating with said fixed auxiliary dies subsequent to the shearing operation and upon further movement of said crosshead for cutting across the ends of certain of said blank strips to remove recovery portions not useable for the can ends.

6. In an apparatus for cutting metal sheets to provide blank strips from which can ends and the like may be formed, the combination of shearing dies for shearing blank strips along their longitudinal edges, and cooperating fixed and movable auxiliary dies associated with and slidable in said shearing dies for cutting off parts of said blank strips immediately following their shearing in said shearing dies and while said strips are still within said shearing dies.

7. In an apparatus for cutting metal sheets to provide blank strips from which can ends and the like may be formed, the combination of shearing dies for cutting longitudinally across a sheet to shear blank strips therefrom, one of the strips produced at each stroke being within spaced longitudinal cutting edges of said shearing dies and cooperating fixed and movable auxiliary dies associated with and fitting as slide blocks in said shearing dies for cutting off the ends of the said blank strip contained within said shearing die immediately following its shearing from said sheet.

8. In an apparatus for cutting metal sheets to provide blank strips from which can ends and the like may be formed, the combination of fixed and cooperating movable shearing dies for shearing blank strips along their longitudinal edges and fixed and cooperating movable auxiliary dies, the former of said auxiliary dies carried in said fixed shearing dies, the latter carried in and adapted for movement relative to said movable shearing dies, a lever associated with each of said movable auxiliary dies, and means for rocking the said lever to effect cooperation between said fixed and said movable auxiliary dies to remove recovery end portions not useable for can ends.

9. Apparatus for cutting from metal sheets longitudinal strips and recovery pieces comprising opposed shearing dies for severing said strips from said sheets and an auxiliary die for severing a recovery piece from a said strip, said auxiliary die being movably confined within a said shearing die and being projectable into cutting position relative to said shearing die.

10. Apparatus for cutting from metal sheets longitudinal strips and recovery pieces comprising opposed shearing dies for severing said strips from said sheets and an auxiliary die for severing a recovery piece from a said strip, said auxiliary die being movably confined within a said shearing die and being projectable into cutting position by the movement of said shearing die.

GEORGE R. JENESON.